(12) United States Patent
Bealmear

(10) Patent No.: US 6,393,670 B1
(45) Date of Patent: May 28, 2002

(54) HOLDING DEVICE AND METHOD

(76) Inventor: Brad M. Bealmear, 54 Barrow St., Apt. 5D, New York, NY (US) 10014

( * ) Notice: Subject to any disclaimer, the term of this patent is extended or adjusted under 35 U.S.C. 154(b) by 0 days.

(21) Appl. No.: 09/734,083

(22) Filed: Dec. 11, 2000

(51) Int. Cl.$^7$ .......................... B65D 63/00; F16G 11/00
(52) U.S. Cl. ............... 24/129 R; 24/16 PB; 24/115 H; 24/129 B
(58) Field of Search .......................... 24/129 R, 129 W, 24/115 H, 300, 30.5 P, 17 AP, 16 R, 16 PB

(56) References Cited

U.S. PATENT DOCUMENTS

| | | | |
|---|---|---|---|
| 268,407 A | * 12/1882 | Hughes | ..................... 24/129 R |
| 1,287,626 A | 12/1918 | Brett | |
| 1,892,262 A | 12/1932 | Andrew | |
| 2,808,632 A | 10/1957 | Cline | |
| 3,099,271 A | 7/1963 | Dubelier | |
| 3,751,769 A | 8/1973 | Reiner | |
| 4,648,159 A | * 3/1987 | Dougherty | ................ 24/129 R |
| 4,930,193 A | * 6/1990 | Baker | ........................ 24/129 R |
| 5,033,169 A | * 7/1991 | Bindon | ..................... 24/129 R |
| 5,036,870 A | 8/1991 | Edmark | |
| 5,062,184 A | * 11/1991 | Rowland | ................... 24/16 PB |
| 5,097,854 A | 3/1992 | Smith | |
| 5,156,171 A | 10/1992 | Goodman | |
| 5,167,245 A | 12/1992 | Harriett | |
| 5,289,834 A | 3/1994 | Lawrence | |
| 5,339,498 A | * 8/1994 | Parsons | ..................... 24/129 R |
| 5,351,367 A | * 10/1994 | Kennedy et al. | .......... 24/129 R |
| 5,462,020 A | 10/1995 | Trimmer | |
| 5,774,945 A | * 7/1998 | Ginocchio | ................... 24/16 R |
| 6,009,882 A | 1/2000 | Schine et al. | |
| 6,049,949 A | * 4/2000 | Guthke | ..................... 24/16 PB |
| 6,076,532 A | 6/2000 | Thomas et al. | |

FOREIGN PATENT DOCUMENTS

| | | | | |
|---|---|---|---|---|
| CA | 0570769 | * | 2/1959 | ............... 24/129 R |
| GB | 1131346 | * | 10/1968 | ............... 24/129 R |

* cited by examiner

Primary Examiner—Victor Sakran

(57) ABSTRACT

A device is provided for gathering, securing, or bracing objects using a tightened coil of flexible cord element. The device includes a positioner element to which is attached a flexible cord element. The cord element is looped once and pulled through a cavity in the positioning element. The looped cord element is placed around one or more objects, and tightened by pulling the free end of the cord element, which is then looped around the objects one or more additional times, the additional loops being formed adjacent to the positioner element. The coiled assembly is locked in place by returning the uncoiled portion of the cord element to the positioner element and pushing a section of cord element into a clip on the unit.

3 Claims, 3 Drawing Sheets

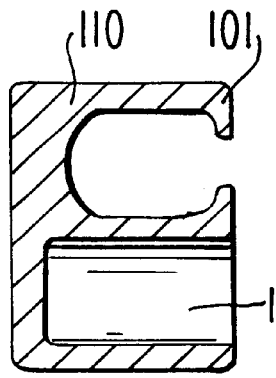
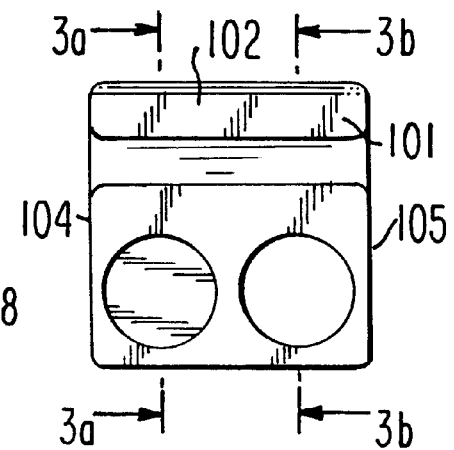
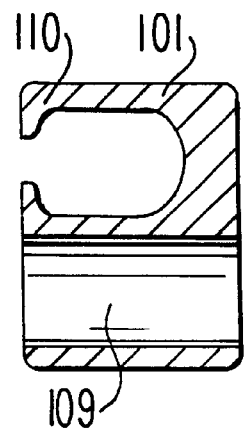
*FIG.3a*     *FIG.3*     *FIG.3b*
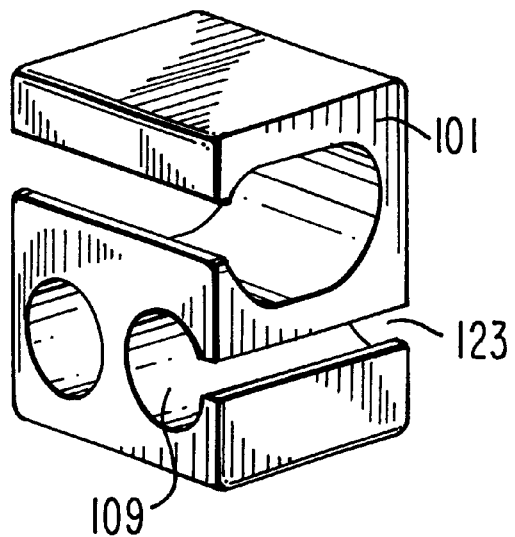
*FIG.4*

HOLDING DEVICE AND METHOD

TECHNICAL FIELD

The invention relates to devices and methods used to gather, secure, or brace objects by means of a tightened coil using a flexible cord element.

BACKGROUND OF THE INVENTION

A flexible cord element, when coiled around an object such as a plant graft or human limb, may serve as a brace or tourniquet. When coiled around two or more objects the assembly serves to gather and hold; for instance securing a bundle of firewood or gathering hair into a ponytail.

In the prior art various means have been used to secure a coiled cord element, depending upon the material and situation. Tape, pins, clips or staples might be used, or the cord element might be knotted or, alternatively, manufactured in a closed loop such as an elastic band.

SUMMARY OF THE INVENTION

The present invention comprises a singular compact positioner element attached to a flexible cord element. The positioner element incorporates an anchoring cavity extending partially or fully through the body of the unit, used to hold one end of a flexible cord element; a coupling cavity, generally parallel to the anchoring cavity, pierced fully through the unit and through which the strand may pass while simultaneously being held with a predetermined amount of friction; and a clip which serves to secure the cord element and complete the coiled assembly. The cavities are located side-by-side in the lower area of the positioner element, while the clip is located at the top of the positioner element.

Additionally the present invention comprises a flexible cord element cemented or otherwise attached to the positioner element within the anchoring cavity, looped once and passed through the coupling cavity to create an adjustable loop. In use the loop is placed around an object or group of objects, tightened, and the cord element is looped one or more additional times around the object or objects, the additional loops being formed adjacent to the positioner element, before the remaining cord element is returned to the positioner element and pressed into and held by the clip.

The present invention also comprises the method of using the described device.

One attribute of the device of the present invention is found in its singular embodiment, wherein a single positioner element attached to a cord element comprises both the initial compressible loop and the terminal attachment to form the final coiled assembly.

Another attribute of the device is a simpler, more attractive visual profile when in use, as compared to the bulkier, more-complicated and less-controllable methods of the prior art.

The present invention provides a handsome, convenient, compact and reusable device, and a method to easily install and remove a holding assembly utilizing a coiled cord element wherever needed.

BRIEF DESCRIPTION OF THE DRAWINGS

FIG. 3 shows a front view of the positioner element of FIG. 1a. FIG. 3a is a cross sectional view taken along lines 3a—3a of FIG. 3; FIG. 3b is a cross sectional view taken along lines 3b—3b of FIG. 3.

FIG. 4 illustrates a slot bisecting the coupling cavity, opening it lengthwise to the side-facing exterior of the positioner element.

REFERENCE NUMERALS IN DRAWINGS

Figure 1A:
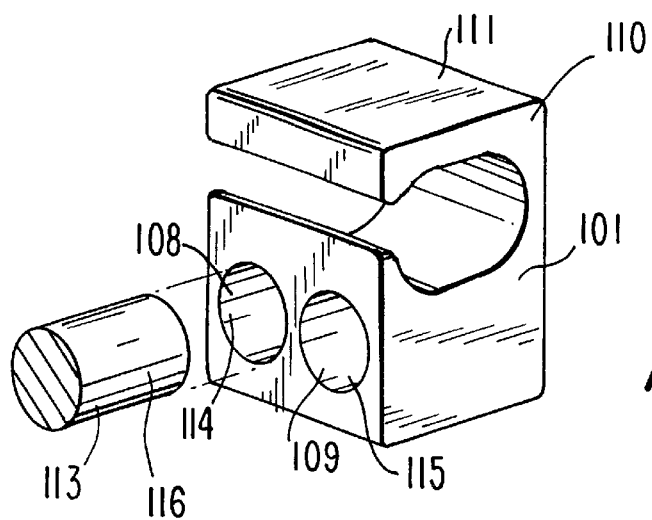
FIGS. 1a–1b each show a 3/4 view of the positioner element of the present invention, with possible clip and cavity variations, along with a cord element to be attached to the unit.

100 Device
101 Positioner element
102 Front of positioner element
103 Back of positioner element
104 Left side of positioner element
105 Right side of positioner element
106 Top of positioner element
107 Bottom of positioner element
108 Anchoring cavity
109 Coupling cavity
110 Clip
111 Front-facing clip
112 Upward-facing clip
113 Cord element
114 Round anchoring cavity
115 Round coupling cavity
116 Round cross-section cord element
117 Rectangular anchoring cavity
118 Rectangular coupling cavity
119 Rectangular cross-section cord element
120 First cord element end
121 Second cord element end
122 Primary loop
123 Slot
124 Rods
125 Auxiliary cord element loops
126 Coiled assembly

DETAILED DESCRIPTION

Figure 1B:
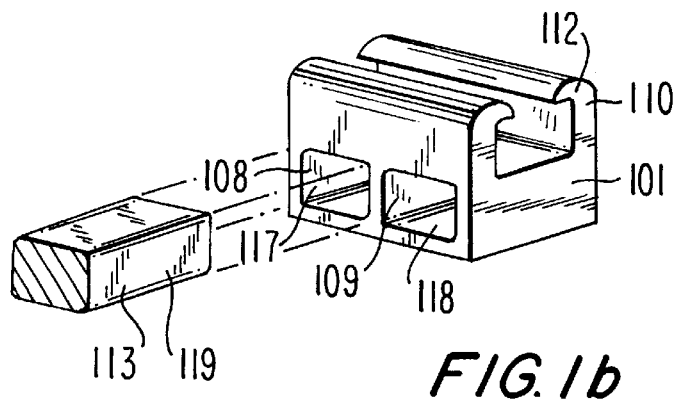

FIGS. 1a–b illustrate the positioner element 101 of the present invention, incorporating clip 110 at the unit's top, and two cavities, anchoring cavity 108 and coupling cavity 109, situated side by side at the bottom of the unit and entering the unit generally parallel to each other. Also seen is cord element 113, to be attached to positioner element 101 to complete the present device.

FIG. 1a indicates one variation of the present device, including front-facing clip 11. Round anchoring cavity 114 and round coupling cavity 115 are used to hold and position round cross-section cord element 116.

FIG. 1*b* shows another variation of the present device, including upward-facing clip 112. Rectangular anchoring cavity 117 and rectangular coupling cavity 118 are used here to hold and position rectangular cross-section cord element 119.

Variations in the shape and direction of clip 110, the contours of cavities 108 and 109, and in the cross-sectional makeup of cord element 113 will depend upon manufacturing materials, designated usage and preferred esthetics determined at the time of production.

Figure 2:
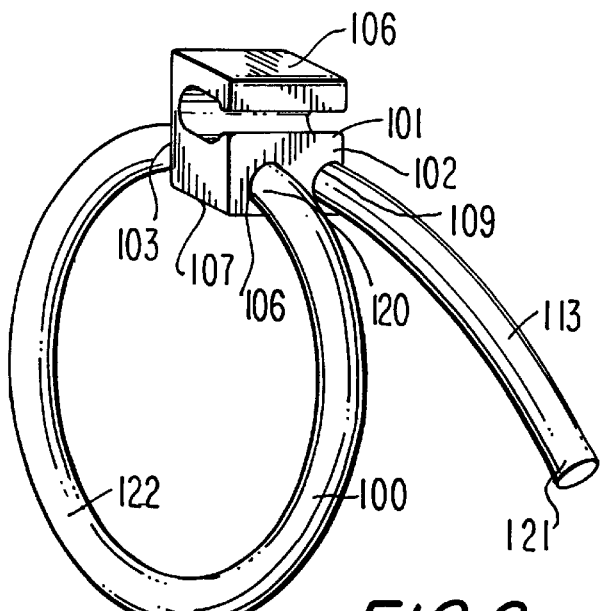
FIGS. 2 depicts the complete device of the present invention.

In FIG. 2 cord element 113 has been attached to positioner element 101 by cementing or otherwise affixing first cord element end 120 within anchoring cavity 108 so that the cord element extends from positioner element front side 102. Second cord element end 121 has been looped below and moved to back side 103 of unit 101 and drawn through alignment cavity 109 to emerge once more from the front side of the unit forming primary loop 122. The complete device 100 of the present invention is thus embodied.

Coupling cavity 109 is generally parallel to anchoring cavity 108, and is of a shape and size to provide a predetermined amount of friction to cord element 113 as the cord element is moved through it. The preferred degree of friction might range from none to extremely tight, depending upon the usage situation. FIG. 3 is a front view illustrating positioner element 101 of FIG. 1*a*. FIGS. 3*a* and 3*b* depict cross-sectional side views. In this case anchoring cavity 108 does not extend completely through the body of the unit, however the cavity may be manufactured completely piercing the body when needed while still serving singularly to anchor the first cord element end to the positioner element.

FIG. 4 illustrates slot 123 bisecting coupling cavity 109, opening the cavity lengthwise along the right or left side of positioner element 101 and allowing cord element 113 to be placed into or pulled from the cavity by the technique of stretching the cord element to reduce its diameter, then moving the cord element laterally. Slot 123 might be incorporated into the device as a safety or convenience feature.

Figure 5:
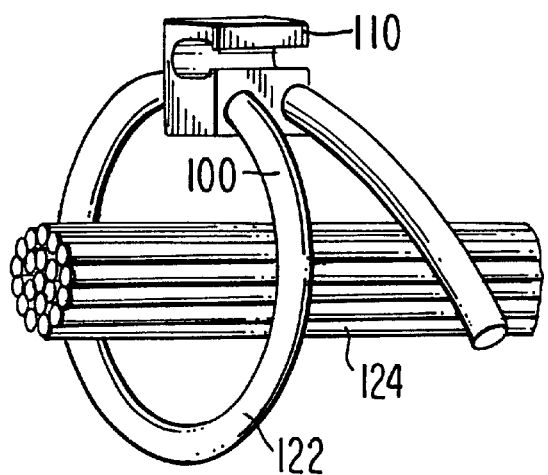
In FIG. 5 the device of the present invention has been placed loosely around a group of rods.

In FIG. 5 primary loop 122 of device 100 has been loosely placed around a group of rods 124.

Figure 6:
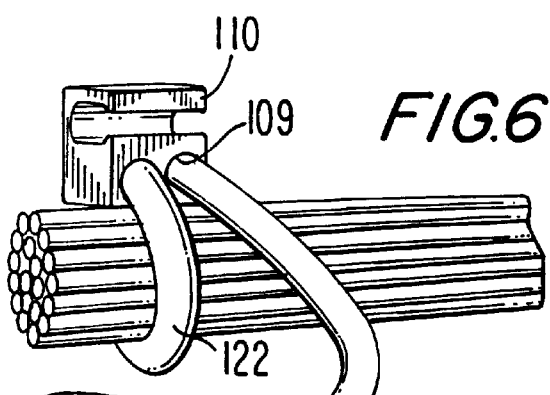
In FIG. 6 the cord element loop has been compressed around the rod bundle by pulling the cord element through the coupling cavity.

In FIG. 6 second cord element end 121 has been pulled, decreasing the diameter of the loop and tightening it around the rod bundle. The diameter of loop 122 may be manipulated by pulling the cord element on either side of coupling cavity 109.

Figure 7:
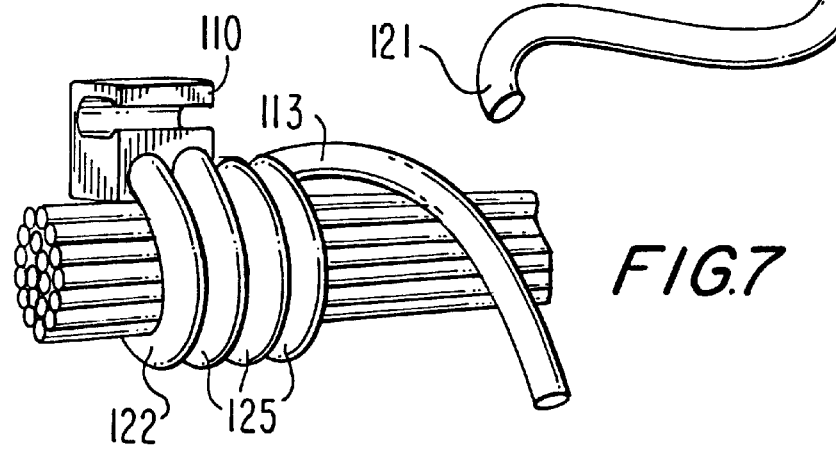
FIG. 7 shows additional cord element loops that have been made around the rod group, adjacent to but not incorporating the positioner element.

Cord element 113 has been wrapped around the rod bundle several times in FIG. 7, with the auxiliary cord element loops 125 continuing adjacent to and parallel to primary loop 122 and adjacent to positioner element 101. As the cord element is coiled it can be tightened to a degree preferred by the user.

Figure 8:
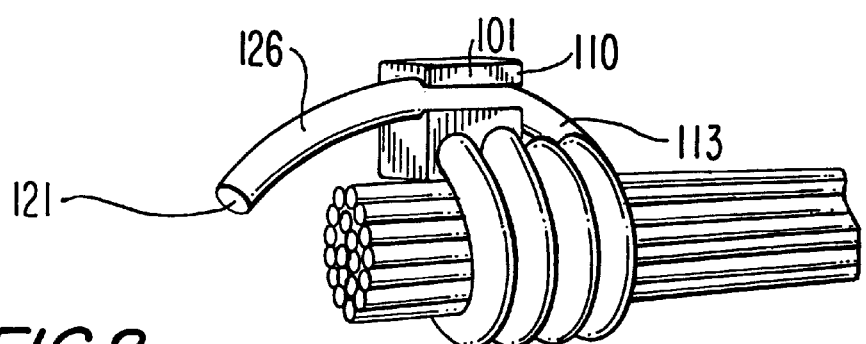
FIG. 8 depicts the completed assembly, with the cord element fastened in the clip.

In FIG. 8 second cord element end 121 has been pulled back toward positioner element 101, and a section of the remaining, uncoiled portion of cord element 113 has been pushed into and held by clip 110 thereby completing the coiled assembly 126.

What is claimed is:

1. A holding device comprising:

a. a cord element having a first end and a second end;

b. a positioner element having a front side and a back side and incorporating an anchoring cavity, a coupling cavity, and a clip;

said cord element to be attached by its first end to said positioner element at said anchoring cavity so that the cord element extends from the front side of the positioner element, the cord element to be looped below the positioner element and drawn through said coupling cavity from the positioner element back side and to emerge from the front side, the coupling cavity being generally parallel to the anchoring cavity, both cavities being situated in the lower part of the positioner element, the resultant cord element loop being variable in diameter when pulled from either side of the coupling cavity, the loop to be placed around one or more objects positioned below the positioner element, the loop to be tightened when the cord element is pulled, the cord element to be wrapped one or more times around said object or objects with the additional cord element loops being adjacent and parallel to the initial cord element loop while not incorporating the positioner element, the remaining uncoiled cord element to be returned to the positioner element and a section of the cord element to be pushed into and held by said clip, the clip being integrated into the top of the positioner element.

2. The device of claim 1 wherein the coupling cavity is bisected by a slot, opening the length of said cavity to the exterior of the positioner element.

3. A method for gathering, securing, or bracing one or more objects, said method comprising:

placing a loop created of a cord element around said object or objects, said loop created by affixing an end of said cord element within an anchoring cavity pierced into a positioner element so that the cord element projects from the front side of said positioner element, the positioner element being pierced through with a coupling cavity parallel to said anchoring cavity, both cavities being situated in the lower part of the positioner element, the cord element being looped below the positioner element and threaded through said coupling cavity from the back side of the positioner element to project from the front side of the positioner element and produce the loop of cord element, the loop being adjustable in size by pulling the cord element on either side of the coupling cavity, the loop being placed loosely around the object or objects and tightened, the cord element being then wrapped around the object or objects one or more additional times while not incorporating the positioner element in said additional loops, the remaining cord element being pulled back to the positioner element and pushed into and held by a clip integrated into the top of the positioner element.

* * * * *